(12) United States Patent
Drews et al.

(10) Patent No.: US 8,893,004 B2
(45) Date of Patent: Nov. 18, 2014

(54) USER INTERFACE PROXY METHOD AND SYSTEM

(75) Inventors: Clemens Drews, San Jose, CA (US); Jeffrey William Nichols, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/778,168

(22) Filed: May 12, 2010

(65) Prior Publication Data
US 2011/0283202 A1    Nov. 17, 2011

(51) Int. Cl.
| | | |
|---|---|---|
| *G06F 15/177* | (2006.01) | |
| *G06F 15/16* | (2006.01) | |
| *G06F 9/455* | (2006.01) | |
| *G06F 3/048* | (2013.01) | |
| *G06F 9/54* | (2006.01) | |

(52) U.S. Cl.
CPC ............... *G06F 9/542* (2013.01); *G06F 3/048* (2013.01)
USPC ............................. 715/733; 709/203; 718/1

(58) Field of Classification Search
CPC .......... G06F 9/45533–9/45558; G06F 3/0481; G06F 3/04812; G06F 3/0482; G06F 21/57; G06F 2212/163
USPC ......... 715/733–746, 174–178, 778, 781, 803, 715/864, 866; 709/203, 226; 718/1, 718/100–108; 726/21, 26; 713/164
See application file for complete search history.

(56) References Cited

U.S. PATENT DOCUMENTS

| | | | |
|---|---|---|---|
| 7,954,150 B2* | 5/2011 | Croft et al. ................... 726/21 |
| 7,996,785 B2* | 8/2011 | Neil .............................. 715/778 |
| 8,141,075 B1* | 3/2012 | Chawla et al. ................ 718/1 |
| 8,213,429 B2* | 7/2012 | Wray et al. .................. 370/392 |
| 8,413,139 B2* | 4/2013 | Shukla et al. ................. 718/1 |
| 8,438,492 B2* | 5/2013 | Park et al. .................... 715/763 |
| 8,656,297 B2* | 2/2014 | Koenig et al. ............... 715/771 |
| 2007/0180493 A1* | 8/2007 | Croft et al. .................... 726/2 |
| 2009/0019436 A1 | 1/2009 | Hartz et al. |
| 2009/0036111 A1* | 2/2009 | Danford et al. ............. 455/419 |
| 2009/0112969 A1* | 4/2009 | Ganesh et al. .............. 709/202 |
| 2009/0204964 A1* | 8/2009 | Foley et al. ................... 718/1 |
| 2009/0210488 A1 | 8/2009 | Lee |
| 2009/0216975 A1 | 8/2009 | Halperin et al. |
| 2010/0235830 A1* | 9/2010 | Shukla et al. ................. 718/1 |
| 2011/0246922 A1* | 10/2011 | Koenig et al. .............. 715/771 |

* cited by examiner

*Primary Examiner* — Tadeese Hailu
*Assistant Examiner* — James T Durkin
(74) *Attorney, Agent, or Firm* — Schmeiser, Olsen & Watts

(57) ABSTRACT

A user interface proxy method and system. The method includes presenting by a computer processor, an application user interface request from a client computing system. The application user interface request includes parameters associated with an application user interface. The computer processor enables a proxy user interface instance within a first cloud instance associated with the parameters. The computer processor transmits the application user interface request to the proxy user interface instance. The computer processor transmits results associated with the application user interface request to the client computing system. The computer processor receives messages associated with interactions between the client computing system and a user. The computer processor transmits the messages to the proxy user interface instance. The computer processor transmits feedback data associated with the messages to the client computing system.

17 Claims, 4 Drawing Sheets

USER INTERFACE PROXY METHOD AND SYSTEM

FIELD OF THE INVENTION

The present invention relates to a method and associated system for enabling a proxy user interface instance within a cloud instance associated with a virtual machine.

BACKGROUND OF THE INVENTION

Enabling a user to communicate with a computing device typically comprises a complicated process with little flexibility. Accordingly, there exists a need in the art to overcome at least some of the deficiencies and limitations described herein above.

SUMMARY OF THE INVENTION

The present invention provides method comprising:
receiving, by a computer processor of a dispatcher computing system, a first application user interface request from a first client computing system, said first application user interface request comprising first parameters associated with a first application user interface;
enabling, by said computer processor in response to said receiving said first application user interface request, a first proxy user interface instance within a first cloud instance associated with said first parameters;
transmitting, by said computer processor to said first proxy user interface instance, said first application user interface request;
receiving, by said computer processor from said first proxy user interface instance, first results associated with said first application user interface request;
transmitting, by said computer processor to said first client computing system, said first results associated with said first application user interface request;
receiving, by said computer processor from said first client computing system, first messages associated with first interactions between said first client computing system and a first user;
transmitting, by said computer processor to said first proxy user interface instance, said first messages;
receiving, by said computer processor from said first proxy user interface instance, first feedback data associated with said first messages; and
transmitting, by said computer processor to said first client computing system, first feedback data associated with said first messages.

The present invention provides a method comprising:
receiving, by a computer processor of a dispatcher computing system, a first application user interface request from a first client computing system, said first application user interface request comprising first parameters associated with a first application user interface;
enabling, by said computer processor in response to said receiving said first application user interface request, a first proxy user interface instance within a first cloud instance associated with said first parameters; and
transmitting, by said computer processor to said first client computing system, a first identifier associated with said first proxy user interface instance, wherein said first client computing system connects to said first proxy user interface instance in response to said transmitting said first identifier, wherein first messages associated with first interactions between a first user and said first client computing system are transmitted to said first proxy user interface instance, and wherein first feedback data associated with said first messages is transmitted to said first client computing system.

The present invention provides a dispatcher computing system comprising a computer processor coupled to a computer-readable memory unit, said memory unit comprising instructions that when enabled by the computer processor implements a method comprising:
receiving, by said computer processor, a first application user interface request from a first client computing system, said first application user interface request comprising first parameters associated with a first application user interface;
enabling, by said computer processor in response to said receiving said first application user interface request, a first proxy user interface instance within a first cloud instance associated with said first parameters;
transmitting, by said computer processor to said first proxy user interface instance, said first application user interface request;
receiving, by said computer processor from said first proxy user interface instance, first results associated with said first application user interface request;
transmitting, by said computer processor to said first client computing system, said first results associated with said first application user interface request;
receiving, by said computer processor from said first client computing system, first messages associated with first interactions between said first client computing system and a first user;
transmitting, by said computer processor to said first proxy user interface instance, said first messages;
receiving, by said computer processor from said first proxy user interface instance, first feedback data associated with said first messages; and
transmitting, by said computer processor to said first client computing system, first feedback data associated with said first messages.

The present invention advantageously provides a simple method and associated system capable of enabling a user to communicate with a computing device.

DETAILED DESCRIPTION OF THE INVENTION

Figure 1:
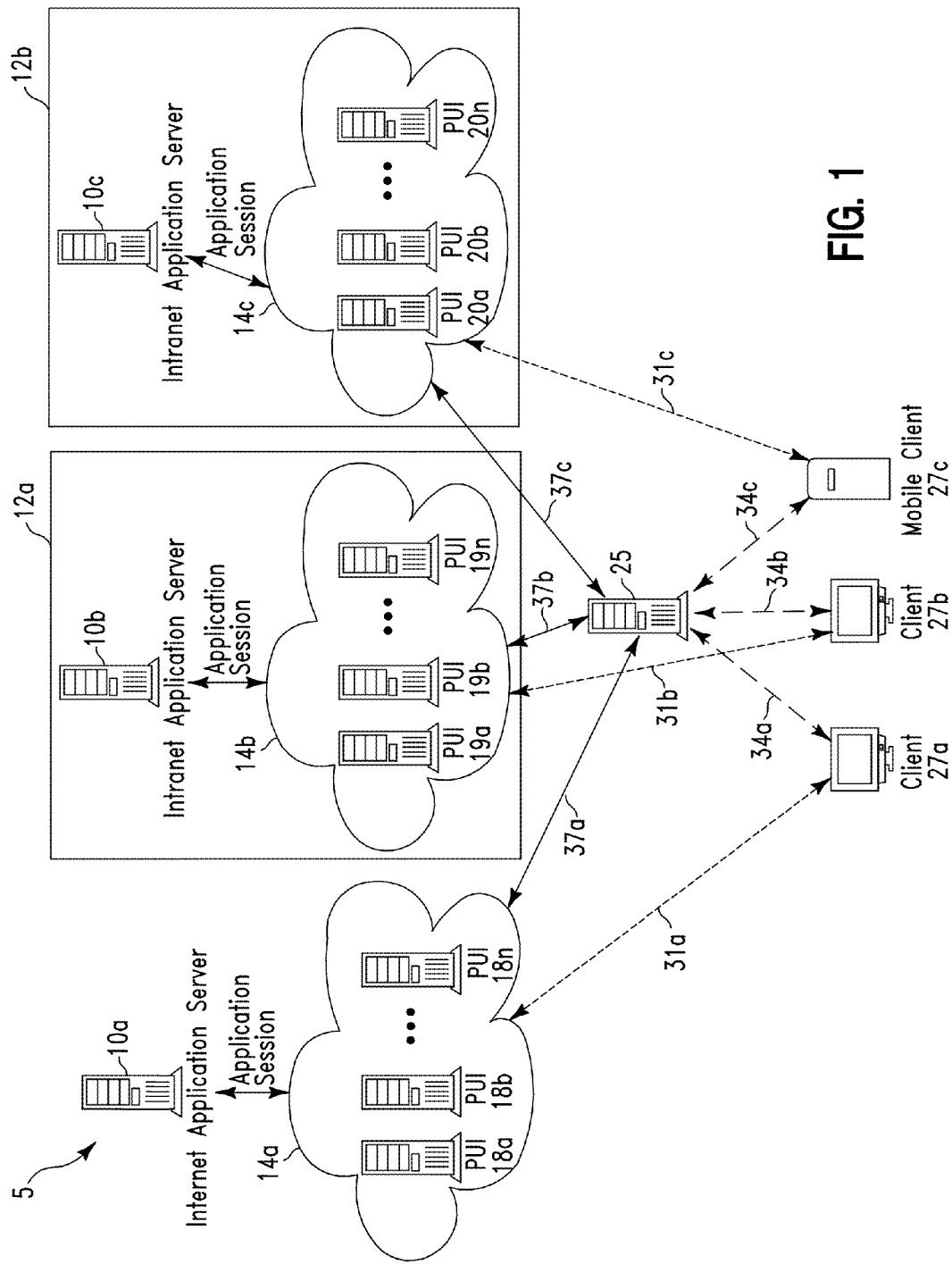
FIG. 1 illustrates a system for enabling a proxy user interface instance within a cloud instance associated with a virtual machine, in accordance with embodiments of the present invention.

FIG. 1 illustrates a system 5 for enabling a proxy user interface instance within a cloud instance associated with a virtual machine, in accordance with embodiments of the present invention. System 5 isolates proxy user interface instances using isolated operating system sessions. System 5 enables a complete isolation of user interface instances by using virtual machine images running on a cloud computing infrastructure. Each virtual machine image enables functionality for handling a proxy user interface instance for one session. A complete isolation is achieved by handling each proxy user interface instance session in a separate virtual machine. Virtual machines are created on demand and may scale to a degree that the cloud has resources available to handle additional proxy user interface instances. A proxy user interface instance is defined herein as a cloud virtual machine instance used to securely proxy a user interface from an application server to a client.

System 5 of FIG. 1 comprises client computing systems 27a . . . 27c connected though a dispatcher computing system 25 to clouds 14a, 14b, and 14c respectively. Additionally, client computing systems 27a . . . 27c may be directly connected (i.e., via links 31a, 31b, and 31c, respectively) to clouds 14a, 14b, and 14c, respectively. Client computing systems 27a . . . 27c connected to dispatcher computing system 25 through links 34a, 34b, and 34c, respectively. Dispatcher computing system 25 is connected to clouds 14a, 14b, and 14c through links 37a, 37b, and 37c, respectively. Clouds 14a, 14b, and 14c comprise proxy user interfaces (instances) 18a . . . 18n, 19a . . . 19n, and 20a . . . 20n, respectively. Clouds 14a, 14b, and 14c are connected to application servers 10a, 10b, and 10c, respectively. A client computing system is defined herein as a user interface (e.g., mobile, desktop, embedded, etc) for requesting a proxy user interface instance (e.g., proxy user interface instances 18a . . . 18n, 19a . . . 19n, and 20a . . . 20n herein referred to as proxy user interfaces 18a . . . 18n, 19a . . . 19n, and 20a . . . 20n). A dispatcher computing system is defined herein as a computing system that controls allocation of proxy user interface instances within any of clouds 14a . . . 14c to which it may dispatch and authenticate clients. An instance location and associated parameters are controlled by properties of client computing systems 27a . . . 27c (e.g., whether a client is authenticated to the server and the client's IP address) and an application that the client is requesting to proxy. A cloud is defined herein as a computing capability providing an abstraction between a computing resource and an associated underlying technical architecture (e.g., servers, storage, networks, etc). A cloud enables on-demand network access to a shared pool of configurable computing resources that may be rapidly provisioned and released with minimal management effort or service provider interaction. An application server is defined herein as a computing system (a server) that serves application user interfaces which are proxied by proxy user interfaces 18a . . . 18n, 19a . . . 19n, and 20a . . . 20n. Each of client computing systems 27a . . . 27c, dispatcher computing system 25, and application servers 10a, 10b, and 10c may comprise any type of computing apparatus including, inter alia, a personal computer (PC), a laptop computer, a computer terminal, a server computer, etc. Cloud 14a may comprise a public Internet cloud. Cloud 14b may comprise a company cloud within a company A Intranet 12a. Cloud 14c may comprise a company cloud within a company B Intranet 12b.

System 5 allows a client (i.e., via client computing systems 27a . . . 27c) wanting to start a session with system 5 (a proxy user interface system) to connect to dispatcher computing system 25 to:
1. Determine various properties of a client connection (e.g., an application user interface type and security domain needed).
2. Instantiates an appropriate proxy user interface for the client's needs.
3. Directs to the client to the proxy user interface in the cloud once the instance is ready.

System 5 allows for:
1. A single point access to the system.
2. Connections being redirected to proxy instances for future requests (i.e., so dispatcher computing system 25 will not become overloaded if many sessions are running concurrently).
3. Dispatcher computing system 25 to select different clouds with different access levels depending on a client. For example, a client request from an internal company user may be routed to an internal company cloud instance that has access to the internal Intranet, while an external request may be routed to an external instance that does not have access inside a firewall.

System 5 automatically and dynamically allocates resources depending on current requirements of proxy user interfaces 18a . . . 18n, 19a . . . 19n, and 20a . . . 20n. System 5 allows for two options for connections from client computing systems 27a . . . 27c to proxy user interfaces 18a . . . 18n, 19a . . . 19n, and 20a . . . 20n:
1. Dispatcher computing system 25 routes client computing systems 27a . . . 27c to proxy user interfaces 18a . . . 18n, 19a . . . 19n, and 20a . . . 20n.
2. Dispatcher computing system 25 allocates client computing systems 27a . . . 27c to proxy user interfaces 18a . . . 18n, 19a . . . 19n, and 20a . . . 20n using direct connections via 31a . . . 31c.

System 5 allows for three options for managing proxy user interface instances within clouds 14a . . . 14c:
1. Dispatcher computing system 25 allocates client computing systems 27a . . . 27c to appropriate already running proxy user interface instances 18a . . . 18n, 19a . . . 19n, and 20a . . . 20n.
2. There are no proxy user interfaces running in clouds 14a . . . 14c at initialization and dispatcher computing system 25 creates new proxy user interface instances as client requests are made.
3. A combination of 1 and 2. For example, dispatcher computing system 25 may maintain a pool of commonly used proxy user interfaces and create less commonly needed proxy user interfaces when requested.

The following processes illustrate various scenarios for using system 5 to enable proxy user interface instances within cloud instances:

Process 1
1. A client (e.g., one of client computing systems 27a . . . 27c) requests an application user interface from dispatcher computing system 25. The request includes request parameters (e.g., an application user interface type and a security domain needed).
2. Dispatcher computing system 25 uses the request parameters to select an existing unused proxy user interface instance (e.g., one of proxy user interfaces 18a . . . 18n, 19a . . . 19n, and 20a . . . 20n) in an appropriate cloud (e.g., one of clouds 14 . . . 14c) matching the request parameters.
3. Dispatcher computing system 25 forwards the client request to the allocated proxy user interface instance and returns any results (e.g., user interface components) to the client.
4. Messages are transmitted to dispatcher computing system 25 as a user interacts with the Client. Dispatcher computing system 25 forwards the messages to the allocated proxy user interface instance and returns feedback data to the client.

Process 2
1. A client (e.g., one of client computing systems 27a . . . 27c) requests an application user interface from dispatcher computing system 25. The request includes request parameters (e.g., an application user interface type and a security domain needed).

2. Dispatcher computing system 25 uses the request parameters to start a new proxy user interface instance in an appropriate cloud (e.g., one of clouds 14 . . . 14*c*) matching the request parameters.

3. Dispatcher computing system 25 forwards the client request to the allocated proxy user interface instance and returns any results (e.g., user interface components) to the client.

4. Messages are transmitted to dispatcher computing system 25 as a user interacts with the Client. Dispatcher computing system 25 forwards the messages to the allocated proxy user interface instance and returns feedback data to the client.

Process 3

1. A client (e.g., one of client computing systems 27*a* . . . 27*c*) requests an application user interface from dispatcher computing system 25. The request includes request parameters (e.g., an application user interface type and a security domain needed).

2. Dispatcher computing system 25 uses the request parameters to select an existing unused proxy user interface instance (e.g., one of proxy user interfaces 18*a* . . . 18*n*, 19*a* . . . 19*n*, and 20*a* . . . 20*n*) in an appropriate cloud (e.g., one of clouds 14 . . . 14*c*) matching the request parameters.

3. Dispatcher computing system 25 returns an identifier for the proxy user interface instance (e.g. an IP address or hostname) to the client. The client then connects (i.e., directly) to the proxy user interface instance.

4. Messages are transmitted the proxy user interface instance as a user interacts with the client and feedback is returned to the client.

Process 4

1. A client (e.g., one of client computing systems 27*a* . . . 27*c*) requests an application user interface from dispatcher computing system 25. The request includes request parameters (e.g., an application user interface type and a security domain needed).

2. Dispatcher computing system 25 uses the request parameters to start a new proxy user interface instance in an appropriate cloud (e.g., one of clouds 14 . . . 14*c*) matching the request parameters.

3. Dispatcher computing system 25 returns an identifier for the proxy user interface instance (e.g. an IP address or hostname) to the client. The client then connects (i.e., directly) to the proxy user interface instance.

4. Messages are transmitted the proxy user interface instance as a user interacts with the client and feedback is returned to the client.

Figure 2:
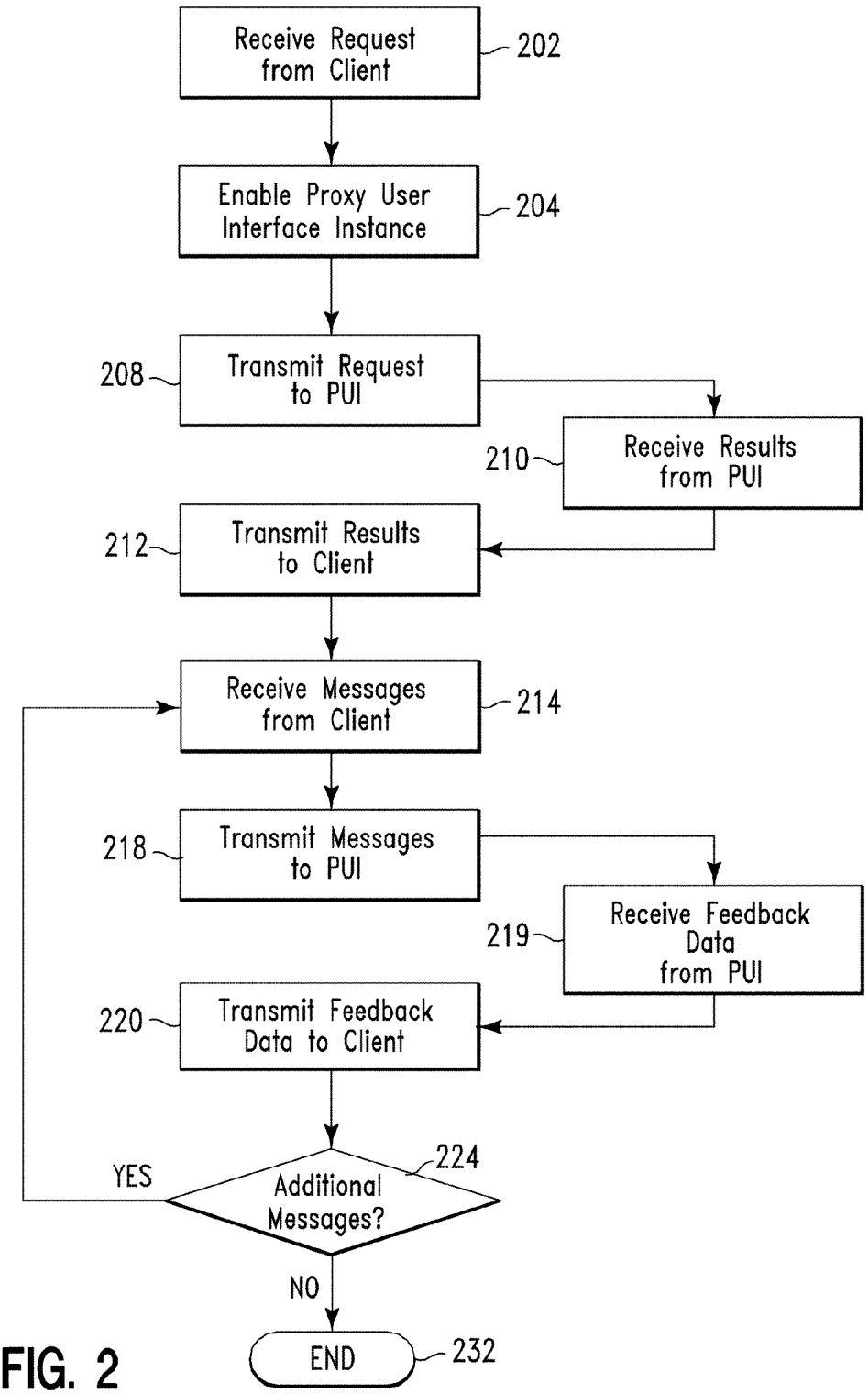
FIG. 2 illustrates a flowchart describing an algorithm used by the system of FIG. 1 for enabling a proxy user interface instance within a cloud instance, in accordance with embodiments of the present invention.

FIG. 2 illustrates a flowchart describing an algorithm used by system 5 of FIG. 1 for enabling a proxy user interface instance within a cloud instance, in accordance with embodiments of the present invention. In step 202, a computer processor of a dispatcher computing system (e.g., dispatcher computing system 25 of FIG. 1) receives an application user interface request from a client computing system (e.g., one of client computing systems 27*a* . . . 27*c* of FIG. 1). The application user interface request includes parameters associated with an application user interface. Parameters may include, inter alia, an application user interface type, a security domain, etc. In step 204, the computer processor enables (i.e., in response to receiving the application user interface request) a proxy user interface instance within a first cloud instance associated with the parameters. The proxy user interface instance may be an existing unused proxy user interface instance. Alternatively, the proxy user interface instance may be generated by the computer processor prior to step 204. In step 208, the computer processor transmits the application user interface request to the proxy user interface instance. In step 210, the computer processor receives (i.e., from the proxy user interface instance) results associated with the application user interface request. In step 212, the computer processor transmits (i.e., to the client computing system) the results associated with the application user interface request. The results may include user interface components associated with the proxy user interface instance. In step 214, the computer processor receives (i.e., from the client computing system) messages associated with interactions between said client computing system and a user. In step 218, the computer processor transmits the messages to the proxy user interface instance. In step 219, the computer processor receives (i.e., from the proxy user interface instance) feedback data associated with the messages. In step 220, the computer processor transmits (i.e., to the client computing system) the feedback data associated with the messages. In step 224, it is determined if there are any additional messages. If in step 224 it is determined that there are messages then the process repeats (i.e., for the additional messages) beginning at step 214. Any new proxy user interface instances (i.e., either enabled or newly generated) may be associated with a same application server or different application servers. Additionally, any new proxy user interface instances (i.e., either enabled or newly generated) may be associated with a same cloud instance or different cloud instances. If in step 224 it is determined that there are not any additional application user interface requests then the process ends in step 232.

Figure 3:
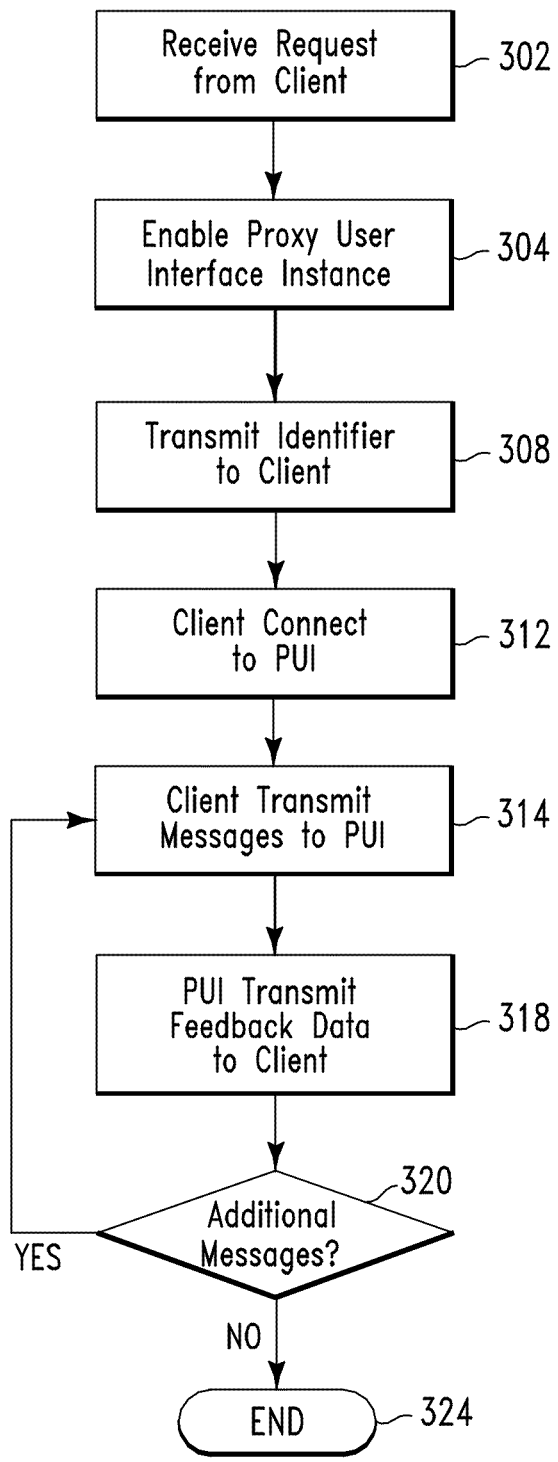
FIG. 3 illustrates an alternative flowchart to the flowchart of FIG. 2, in accordance with embodiments of the present invention.

FIG. 3 illustrates an alternative flowchart to the flowchart of FIG. 2 describing an algorithm used by system 5 of FIG. 1 for enabling a proxy user interface instance within a cloud instance, in accordance with embodiments of the present invention. In step 302, a computer processor of a dispatcher computing system (e.g., dispatcher computing system 25 of FIG. 1) receives an application user interface request from a client computing system (e.g., one of client computing systems 27*a* . . . 27*c* of FIG. 1). The application user interface request includes parameters associated with an application user interface. Parameters may include, inter alia, an application user interface type, a security domain, etc. In step 304, the computer processor enables (i.e., in response to receiving the application user interface request) a proxy user interface instance within a first cloud instance associated with the parameters. The proxy user interface instance may be an existing unused proxy user interface instance. Alternatively, the proxy user interface instance may be generated by the computer processor prior to step 304. In step 308, computer processor transmits (i.e., to client computing system an identifier associated with the proxy user interface instance. In step 312, the client computing system connects to the proxy user interface instance in response to the identifier. In step 314, messages (i.e., associated with interactions between a user and a client computing system) are transmitted to the proxy user interface instance. In step 318, feedback data (i.e., associated with the messages) is transmitted to the client computing system. In step 320, it is determined if there are any additional application user interface requests. If in step 320 it is determined that there are additional application user interface requests then the process repeats (i.e., for the additional request) beginning at step 302. Any new proxy user interface instances (i.e., either enabled or newly generated) may be associated with a same application server or different application servers. Additionally, any new proxy user interface instances (i.e., either enabled or newly generated) may be associated with a same cloud instance or different cloud instances. If in step 320 it is determined that there are not any additional application user interface requests then the process ends in step 324.

Figure 4:
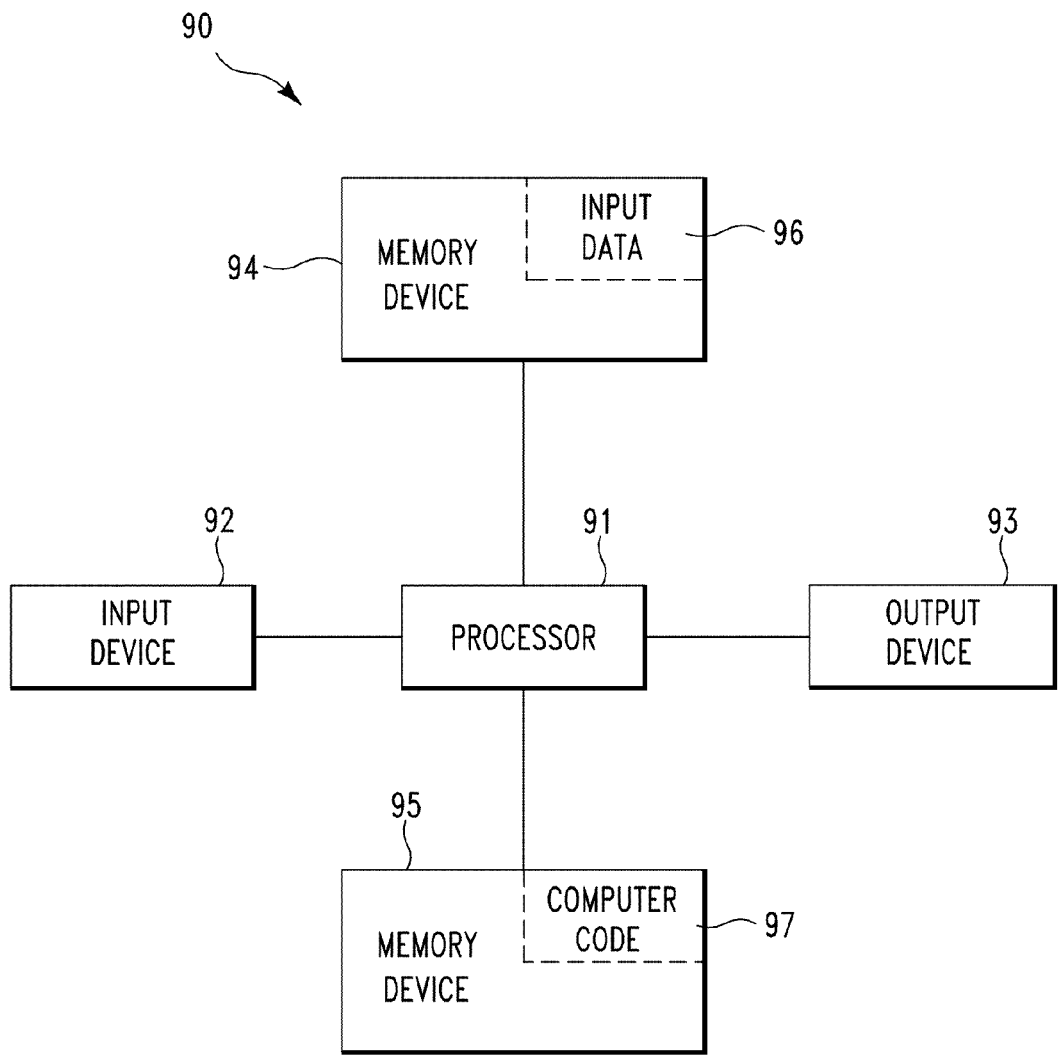
FIG. 4 illustrates a computer apparatus used for enabling a proxy user interface instance within a cloud instance, in accordance with embodiments of the present invention.

FIG. 4 illustrates a computer apparatus 90 (e.g., dispatcher computing system 25 of FIG. 1) used for enabling a proxy user interface instance within a cloud instance, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for enabling a proxy user interface instance within a cloud instance. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to enable a proxy user interface instance within a cloud instance. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for enabling a proxy user interface instance within a cloud instance. In another embodiment, the invention provides a method that performs the process steps of the invention on a subscription, advertising, and/or fee basis. That is, a service provider, such as a Solution Integrator, could offer to enable a proxy user interface instance within a cloud instance. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a dispatcher computing system, a first application user interface request from a first client computing system, said first application user interface request comprising first parameters associated with a first application user interface, wherein said first parameters comprise an application user interface type and a necessary security domain;
maintaining, by said computer processor, a pool comprising configurable and commonly used proxy user interfaces;
determining, by said computer processor, a specified type of proxy user interface;
determining, by said computer processor, a specified access level of said user;
additionally determining, by said computer processor based on said specified access level, if said specified access level of said user is associated with an internal company Intranet or an external, from said internal company Intranet, network without access to a firewall of said company;
selecting, by said computer processor based on properties of said first client computing system, an associated application requested for proxy, and results of said additionally determining, a proxy user interface instance location and associated parameters;
initializing, by said computer processor, a first cloud instance without any proxy user interfaces;
transmitting, by said computer processor to said first client computing system, an IP address or a hostname of a first proxy user interface;
enabling on demand, by said computer processor in response to said receiving said first application user interface request, said transmitting said IP address or said hostname, and said initializing, said first proxy user interface instance within said first cloud instance associated with said first parameters and said proxy user interface instance location, wherein said first proxy user interface instance is selected from said pool, wherein said first proxy user interface instance is enabled within a first cloud virtual machine instance associated with only said first proxy user interface instance, wherein said first proxy user interface is completely isolated from any additional proxy user interfaces, wherein said first cloud virtual machine instance is selected based on said specified access level, and wherein said enabling is based on said specified type of proxy user interface and said specified access level;
isolating, by said computing system, said first proxy user interface instance by enabling a first isolated operating system session associated with only said first proxy user interface;
transmitting, by said computer processor to said first proxy user interface instance, said first application user interface request;
receiving, by said computer processor from said first proxy user interface instance, first results associated with said first application user interface request;
transmitting, by said computer processor to said first client computing system, said first results associated with said first application user interface request;

receiving, by said computer processor from said first client computing system, first messages associated with first interactions between said first client computing system and a first user;

transmitting, by said computer processor to said first proxy user interface instance, said first messages;

receiving, by said computer processor from said first proxy user interface instance, first feedback data associated with said first messages;

transmitting, by said computer processor to said first client computing system, first feedback data associated with said first messages; and redirecting, by said computer processor, proxy user interface connections to said additional proxy user interfaces for future proxy interface requests such that said dispatcher computing system will not become overloaded if multiple operating system sessions are running concurrently.

2. The method of claim 1, further comprising:

receiving, by said computer processor, a second application user interface request from a second client computing system, said second application user interface request comprising second parameters associated with a second application user interface;

enabling, by said computer processor in response to said receiving said second application user interface request, a second proxy user interface instance within said first cloud instance associated with said second parameters;

transmitting, by said computer processor to said second proxy user interface instance, said second application user interface request;

receiving, by said computer processor from said second proxy user interface instance, second results associated with said second application user interface request;

transmitting, by said computer processor to said second client computing system, said second results associated with said second application user interface request;

receiving, by said computer processor from said second client computing system, second messages associated with second interactions between said second client computing system and a second user;

transmitting, by said computer processor to said second proxy user interface instance, said second messages;

receiving, by said computer processor from said second proxy user interface instance, second feedback data associated with said second messages; and transmitting, by said computer processor to said second client computing system, said second feedback data associated with said second messages.

3. The method of claim 2, wherein said first proxy user interface instance is associated with a first application server, and wherein said second proxy user interface is associated with said first application server.

4. The method of claim 2, wherein said first proxy user interface instance is associated with a first application server, and wherein said second proxy user interface is associated with a second application server, and wherein said first application server differs from said second application server.

5. The method of claim 2, further comprising:

receiving, by said computer processor, a third application user interface request from a third client computing system, said third application user interface request comprising third parameters associated with a third application user interface;

enabling, by said computer processor in response to said receiving said third application user interface request, a third proxy user interface instance within a second cloud instance associated with said third parameters, wherein said second cloud instance differs from said first cloud instance;

transmitting, by said computer processor to said third proxy user interface instance, said third application user interface request;

receiving, by said computer processor from said third proxy user interface instance, third results associated with said third application user interface request;

transmitting, by said computer processor to said third client computing system, said third results associated with said third application user interface request;

receiving, by said computer processor from said third client computing system, third messages associated with third interactions between said third client computing system and a third user;

transmitting, by said computer processor to said third proxy user interface instance, said third messages;

receiving, by said computer processor from said third proxy user interface instance, third feedback data associated with said third messages; and transmitting, by said computer processor to said third client computing system, said third feedback data associated with said third messages.

6. The method of claim 1, wherein said first proxy user interface instance comprises an existing unused proxy user interface instance.

7. The method of claim 1, further comprising:

before said enabling, generating by said computer processor, said first proxy user interface instance.

8. A method comprising:

receiving, by a computer processor of a dispatcher computing system, a first application user interface request from a first client computing system, said first application user interface request comprising first parameters associated with a first application user interface, wherein said first parameters comprise an application user interface type and a necessary security domain;

maintaining, by said computer processor, a pool comprising configurable and commonly used proxy user interfaces;

determining, by said computer processor, a specified type of proxy user interface;

determining, by said computer processor, a specified access level of said user;

additionally determining, by said computer processor based on said specified access level, if said specified access level of said user is associated with an internal company Intranet or an external, from said internal company Intranet, network without access to a firewall of said company;

selecting, by said computer processor based on properties of said first client computing system, an associated application requested for proxy, and results of said additionally determining, a proxy user interface instance location and associated parameters;

initializing, by said computer processor, a first cloud instance without any proxy user interfaces;

transmitting, by said computer processor to said first client computing system, an IP address or a hostname of a first proxy user interface;

enabling on demand, by said computer processor in response to said receiving said first application user interface request, said transmitting said IP address or said hostname, and said initializing, said first proxy user interface instance within said first cloud instance associated with said first parameters and said proxy user interface instance location, wherein said first proxy user interface instance is selected from said pool, wherein said first proxy user interface instance is enabled within a first cloud virtual machine instance associated with only said first proxy user interface instance, wherein said first proxy user interface is completely isolated from any additional proxy user interfaces, wherein said first cloud virtual machine instance is selected based on said specified access level, and wherein said enabling is based on said specified type of proxy user interface and said specified access level;

scaling, by said computer processor, said first proxy user interface such said first cloud virtual machine instance comprises resources available to handle said additional proxy user interfaces;

isolating, by said computing system, said first proxy user interface instance by enabling a first isolated operating system session associated with only said first proxy user interface;

transmitting, by said computer processor to said first proxy user interface instance, said first application user interface request;

receiving, by said computer processor from said first proxy user interface instance, first results associated with said first application user interface request;

transmitting, by said computer processor to said first client computing system, said first results associated with said first application user interface request;

receiving, by said computer processor from said first client computing system, first messages associated with first interactions between said first client computing system and a first user;

transmitting, by said computer processor to said first proxy user interface instance, said first messages;

receiving, by said computer processor from said first proxy user interface instance, first feedback data associated with said first messages;

transmitting, by said computer processor to said first client computing system, first feedback data associated with said first messages; and redirecting, by said computer processor, proxy user interface connections to said additional proxy user interfaces for future proxy interface requests such that said dispatcher computing system will not become overloaded if multiple operating system sessions are running concurrently.

9. The method of claim 8 further comprising:

receiving, by said computer processor, a second application user interface request from a second client computing system, said second application user interface request comprising second parameters associated with a second application user interface;

enabling, by said computer processor in response to said receiving said second application user interface request, a second proxy user interface instance within said first cloud instance associated with said second parameters; and transmitting, by said computer processor to said second client computing system, a second identifier associated with said second proxy user interface instance, wherein said second client computing system connects to said second proxy user interface instance in response to said transmitting said second identifier, wherein second messages associated with second interactions between a second user and said second client computing system are transmitted to said second proxy user interface instance, and wherein second feedback data associated with said second messages is transmitted to said second client computing system.

10. The method of claim 9, wherein said first proxy user interface instance is associated with a first application server, and wherein said second proxy user interface is associated with said first application server.

11. The method of claim 9, wherein said first proxy user interface instance is associated with a first application server, and wherein said second proxy user interface is associated with a second application server, and wherein said first application server differs from said second application server.

12. The method of claim 9, further comprising:

receiving, by said computer processor, a third application user interface request from a third client computing system, said third application user interface request comprising third parameters associated with a third application user interface;

enabling, by said computer processor in response to said receiving said third application user interface request, a third proxy user interface instance within a second cloud instance associated with said third parameters, wherein said second cloud instance differs from said first cloud instance; and transmitting, by said computer processor to said third client computing system, a third identifier associated with said third proxy user interface instance, wherein said third client computing system connects to said third proxy user interface instance in response to said transmitting said third identifier, wherein third messages associated with third interactions between a third user and said third client computing system are transmitted to said third proxy user interface instance, and wherein third feedback data associated with said third messages is transmitted to said third client computing system.

13. The method of claim 8, wherein said first proxy user interface instance comprises an existing unused proxy user interface instance.

14. The method of claim 8, further comprising:

before said enabling, generating by said computer processor, said first proxy user interface instance.

15. The method of claim 8, wherein said first identifier comprises an Internet protocol address.

16. The method of claim 8, wherein said first identifier comprises a hostname.

17. A dispatcher computing system comprising a computer processor coupled to a computer-readable memory unit, said memory unit comprising instructions that when enabled by the computer processor implements a method comprising:

receiving, by said computer processor, a first application user interface request from a first client computing system, said first application user interface request comprising of first parameters associated with a first application user interface, wherein said first parameters comprise of an application user interface type and a necessary security domain;

maintaining, by said computer processor, a pool comprising configurable and commonly used proxy user interfaces;

determining, by said computer processor, a specified type of proxy user interface;

determining, by said computer processor, a specified access level of said user;

additionally determining, by said computer processor based on said specified access level, if said specified access level of said user is associated with an internal company Intranet or an external, from said internal company Intranet, network without access to a firewall of said company;

selecting, by said computer processor based on properties of said first client computing system, an associated application requested for proxy, and results of said additionally determining, a proxy user interface instance location and associated parameters;

initializing, by said computer processor, a first cloud instance without any proxy user interfaces;

transmitting, by said computer processor to said first client computing system, an IP address or a hostname of a first proxy user interface;

enabling on demand, by said computer processor in response to said receiving said first application user interface request, said transmitting said IP address or said hostname, and said initializing, said first proxy user interface instance within said first cloud instance associated with said first parameters and said proxy user interface instance location, wherein said first proxy user interface instance is selected from said pool, wherein said first proxy user interface instance is enabled within a first cloud virtual machine instance associated with only said first proxy user interface instance, wherein said first proxy user interface is completely isolated from any additional proxy user interfaces, wherein said first cloud virtual machine instance is selected based on said specified access level, and wherein said enabling is based on said specified type of proxy user interface and said specified access level;

isolating, by said computing system, said first proxy user interface instance by enabling a first isolated operating system session associated with only said first proxy user interface;

transmitting, by said computer processor to said first proxy user interface instance, said first application user interface request;

receiving, by said computer processor from said first proxy user interface instance, first results associated with said first application user interface request;

transmitting, by said computer processor to said first client computing system, said first results associated with said first application user interface request;

receiving, by said computer processor from said first client computing system, first messages associated with first interactions between said first client computing system and a first user;

transmitting, by said computer processor to said first proxy user interface instance, said first messages;

receiving, by said computer processor from said first proxy user interface instance, first feedback data associated with said first messages;

transmitting, by said computer processor to said first client computing system, first feedback data associated with said first messages; and redirecting, by said computer processor, proxy user interface connections to said additional proxy user interfaces for future proxy interface requests such that said dispatcher computing system will not become overloaded if multiple operating system sessions are running concurrently.

\* \* \* \* \*